(12) United States Patent
Wong et al.

(10) Patent No.: US 11,725,097 B2
(45) Date of Patent: Aug. 15, 2023

(54) ELASTOMERIC ARTICLE

(71) Applicant: Top Glove International Sdn. Bhd., Klang (MY)

(72) Inventors: Chong Ban Wong, Klang (MY); Keuw Wei Lim, Klang (MY); Siew Szen Ling, Klang (MY); Siti Ayuni Hamka, Klang (MY)

(73) Assignee: Top Glove International Sdn. Bhd.

( * ) Notice: Subject to any disclaimer, the term of this patent is extended or adjusted under 35 U.S.C. 154(b) by 111 days.

(21) Appl. No.: 16/857,024

(22) Filed: Apr. 23, 2020

(65) Prior Publication Data

US 2020/0369859 A1    Nov. 26, 2020

(51) Int. Cl.
    *C08L 11/00* (2006.01)
    *A41D 19/00* (2006.01)

(52) U.S. Cl.
    CPC .......... *C08L 11/00* (2013.01); *A41D 19/0006* (2013.01); *C08L 2201/08* (2013.01); *C08L 2205/03* (2013.01); *C08L 2207/04* (2013.01)

(58) Field of Classification Search
    CPC .... C08L 11/00; C08L 9/02; C08L 9/04; C08L 2201/08; C08L 2205/03; C08L 2207/04; A41D 19/0006
    See application file for complete search history.

(56) References Cited

U.S. PATENT DOCUMENTS

| | | | |
|---|---|---|---|
| 9,243,117 B2 * | 1/2016 | Khoo | C08J 5/02 |
| 10,023,718 B2 * | 7/2018 | Liou | C08J 5/02 |
| 10,787,561 B2 * | 9/2020 | Lee | C08L 15/00 |
| 2003/0088002 A1 | 5/2003 | Dzikowicz | |
| 2010/0138978 A1 * | 6/2010 | Ikeda | C08L 11/02 |
| | | | 2/168 |
| 2015/0135403 A1 * | 5/2015 | Mercado | A41D 19/04 |
| | | | 524/502 |
| 2017/0137584 A1 | 5/2017 | Tung et al. | |
| 2018/0016409 A1 * | 1/2018 | Liou | C08J 5/02 |
| 2019/0029342 A1 | 1/2019 | Foo et al. | |
| 2019/0040238 A1 * | 2/2019 | Lee | A61B 42/10 |

FOREIGN PATENT DOCUMENTS

| | | | | |
|---|---|---|---|---|
| WO | WO-9924507 A1 * | 5/1999 | | C08L 11/00 |
| WO | 2001090236 A1 | 11/2001 | | |
| WO | WO-0190236 A1 * | 11/2001 | | A41D 19/0055 |
| WO | WO-2015006807 A1 * | 1/2015 | | A41D 19/0062 |
| WO | WO-2018099674 A1 * | 6/2018 | | C08K 3/346 |
| WO | 2019074354 A1 | 4/2019 | | |

OTHER PUBLICATIONS

Wingstay L Technical Data Sheet, 2012 (one page) (Year: 2012).*
Marie-Noelle Crepy, "Rubber: New Allergens and Preventive Measures," 26 European Journal of Dermatology 523-30 (2016) (Year: 2016).*

* cited by examiner

*Primary Examiner* — Angela C Scott
(74) *Attorney, Agent, or Firm* — Greenberg Traurig, LLP

(57) ABSTRACT

An accelerator-free elastomeric formulation comprising base polymers, crosslinkers, stabilizers, an activator, an antioxidant, a pigment, a wax, an antifoam and a pH adjuster. A method of preparing an accelerator-free elastomeric formulation, comprising the steps of mixing Base polymer A with Crosslinker A to produce mixture A, adding while stirring Stabilizer A, Crosslinker B, an activator, an antioxidant, a pigment, a wax and an antifoam one after another with no particular order and followed by a pH adjuster into the mixture A to produce mixture B, adding Base polymer B and Stabilizer B one after another with no particular order into the mixture B to produce an accelerator-free elastomeric formulation and allowing the accelerator-free elastomeric formulation to mature.

11 Claims, No Drawings

ELASTOMERIC ARTICLE

CROSS-REFERENCE TO RELATED APPLICATION

This application claims priority under 35 U.S.C. § 119 to Malaysia Patent Application No. PI2019002885, filed May 23, 2019, the disclosure of which is incorporated by reference herein in its entirety.

FIELD OF THE INVENTION

The present invention relates to an accelerator-free elastomeric formulation and glove manufactured therefrom, in particular the present invention relates to an elastomeric formulation used to prepare hybrid elastomeric product with enhanced mechanical properties.

BACKGROUND OF THE INVENTION

Conventionally, accelerators such as but not limited to thiuram, guanidine and carbamates are incorporated into natural rubber latex formulation and/or synthetic latex formulation to accelerate crosslinking process at a time of preparing elastomeric products. However, hypersensitive users suffer with skin conditions, for instance type IV allergy due to the presence of accelerators in the elastomeric products such as but not limited to elastomeric glove.

In order to circumvent the above condition, research was carried out and synthetic latex was formulated without using accelerators i.e. nitrile glove. Presently, accelerator-free nitrile glove is commonly attained from the market wherein the accelerator-free nitrile glove protects users from aforementioned allergy. Yet, the accelerator-free nitrile glove has number of drawbacks/setbacks such as but not limited to (1) stiffness and (2) wearing out easily due to durability issue.

Having said the above, it is obvious that existing accelerator-free elastomeric product particularly accelerator-free glove has its own disadvantages. As such, there is a need to identify a suitable elastomeric formulation to produce an accelerator-free glove that solves both the allergy and the durability issues, as well as able to exhibit but not limited to higher elongation, higher stress relaxation, softness and higher durability.

SUMMARY OF THE INVENTION

The present invention relates to an accelerator-free elastomeric formulation comprising (a) base polymers, wherein the base polymers are a mixture of Base polymer A and Base polymer B, wherein the Base polymer A is used in an amount ranging between 30 phr to 50 phr and wherein the Base polymer B is used in an amount ranging between 50 phr to 70 phr, (b) crosslinkers, wherein the crosslinkers are a mixture of Crosslinker A and Crosslinker B, wherein the Crosslinker A is used in an amount ranging between 0.40 phr to 1.00 phr based on total dry weight of the base polymers and wherein the Crosslinker B is used in an amount ranging between 0.10 phr to 0.40 phr based on total dry weight of the base polymers, (c) stabilizers, wherein the stabilizers are base polymer specific, wherein the stabilizer used with Base polymer A is Stabilizer A and the stabilizer used with Base polymer B is Stabilizer B, wherein the Stabilizer A is used in an amount ranging between 0.15 phr to 1.00 phr based on total dry weight of the base polymers and wherein the Stabilizer B is used in an amount ranging between 0.50 phr to 2.50 phr based on total dry weight of the base polymers, (d) activator, wherein the activator is used in an amount ranging between 0.40 phr to 1.00 phr based on total dry weight of the base polymers, (e) antioxidant, wherein the antioxidant is used in an amount ranging between 0.50 phr to 2.00 phr based on total dry weight of the base polymers, (f) pigment, wherein the pigment is used in an amount ranging between 0.80 phr to 1.50 phr based on total dry weight of the base polymers, (g) wax, wherein the wax is used in an amount ranging between 0.30 phr to 0.80 phr based on total dry weight of the base polymers, (h) antifoam, wherein the antifoam is used in an amount ranging between 0.01 phr to 0.15 phr based on total dry weight of the base polymers; and (i) pH adjuster, wherein the pH adjuster in an amount ranging between 0.70 phr to 2.00 phr based on total dry weight of the base polymers.

Also, the present invention discloses a method of preparing accelerator-free elastomeric formulation, wherein the method comprising the steps of (i) mixing Base polymer A with Crosslinker A to produce mixture A and stirring the mixture A for a duration between 10 minutes to 40 minutes, wherein the Crosslinker A is used in an amount ranging between 0.40 phr to 1.00 phr based on total dry weight of the base polymers, (ii) adding while stirring Stabilizer A, Crosslinker B, activator, antioxidant, pigment, wax and antifoam one after another with no particular order and followed by pH adjuster into the mixture A to produce mixture B, wherein the mixture B comprising the Stabilizer A in an amount ranging between 0.15 phr to 1.00 phr based on total dry weight of the base polymers, the Crosslinker B in an amount ranging between 0.10 phr to 0.40 phr based on total dry weight of the base polymers, the activator in an amount ranging between 0.40 phr to 1.00 phr based on total dry weight of the base polymers, the antioxidant in an amount ranging between 0.50 phr to 2.00 phr based on total dry weight of the base polymers, the pigment in an amount ranging between 0.80 phr to 1.50 phr based on total dry weight of the base polymers, the wax in an amount ranging between 0.30 phr to 0.80 phr based on total dry weight of the base polymers, the antifoam in an amount ranging between 0.01 phr to 0.15 phr based on total dry weight of the base polymers, the pH adjuster in an amount ranging between 0.70 phr to 2.00 phr based on total dry weight of the base polymers, wherein the mixture B is continuously stirred for a duration of 3 hours to 6 hours and wherein pH range of the mixture B is adjusted to be between 10.70 to 12.00, (iii) adding Base polymer B and Stabilizer B one after another with no particular order into the mixture B to produce accelerator-free elastomeric formulation and allowing the accelerator-free elastomeric formulation to mature for a duration between 1 day to 3 days, wherein the Stabilizer B is used in an amount ranging between 0.50 phr to 2.50 phr based on total dry weight of the base polymers, wherein the Base polymer A is used in an amount ranging between 30 phr to 50 phr and wherein the Base polymer B is used in an amount ranging between 50 phr to 70 phr to make up to the total dry weight of the base polymers.

DETAILED DESCRIPTION OF THE INVENTION

Detailed description of preferred embodiments of the present invention is disclosed herein. It should be understood, however, that the embodiments are merely exemplary of the present invention, which may be embodied in various forms. Therefore, the details disclosed herein are not to be interpreted as limiting, but merely as the basis for the claims and for teaching one skilled in the art of the invention. The numerical data or ranges used in the specification are not to be construed as limiting.

The present invention relates to an accelerator-free elastomeric formulation and accelerator-free elastomeric product manufactured therefrom. In particular, the accelerator-free hybrid elastomeric product is accelerator-free hybrid elastomeric glove that is able to resolves both the allergy (i.e. Type IV (delayed hypersensitivity) allergy) and the durability issues. Also, the accelerator-free hybrid elastomeric glove is softer and exhibits higher elongation, higher stress relaxation and higher durability, which will be further detailed in the example section (i.e. particularly see tables 2 to 6).

The accelerator-free elastomeric formulation comprising (a) base polymers, (b) crosslinkers, (c) stabilizers, (d) activator, (e) antioxidant, (f) pigment, (g) wax, (h) antifoam and (i) pH adjuster. The base polymers are mixture of:

any one selected from the group consisting of acrylonitrile butadiene rubber (NBR) and polyisoprene rubber (PI), preferably NBR. For the purpose of this invention hereinafter any base polymer selected from this group will be regarded as Base polymer A; and polychloroprene rubber (CR), whereby for the purpose of this invention hereinafter CR will be regarded as Base polymer B. For the purpose of this invention, the term "hybrid" signifies presence (or mixture) of both the Base polymer A and Base polymer B in the same elastomeric formulation.

The crosslinkers are a mixture of:

any one selected from the group consisting of sodium aluminate, aluminium oxide, aluminium sulphate, aluminium chloride, aluminium hydroxide, aluminium phosphate or mixtures therefrom, preferably sodium aluminate. For the purpose of this invention hereinafter any crosslinker selected from this group will be regarded as Crosslinker A; and any one selected from the group consisting of sulphur, benzothiazole sulfonamide or mixtures therefrom, preferably sulphur. For the purpose of this invention hereinafter any crosslinker selected from this group will be regarded as Crosslinker B.

The stabilizers are base polymer specific, wherein the stabilizer used with Base polymer A is any one selected from the group consisting of sodium dodecyl benzene sulphonate (SDBS), alkyldiphenyloxide disulphonate, dioctyl sulphosuccinates, alkyl benzene sulphonate or mixtures therefrom, preferably SDBS. For the purpose of this invention hereinafter any stabilizer selected from this group will be regarded as Stabilizer A;

the stabilizer used with Base polymer B is any one selected from either sulphated methyl oleate or sodium alkyl sulphates or mixtures therefrom, preferably sulphated methyl oleate. For the purpose of this invention hereinafter any stabilizer selected from this group will be regarded as Stabilizer B.

The activator is any one selected from the group consisting of zinc oxide, magnesium oxide, copper oxide, aluminium oxide or mixtures therefrom, preferably zinc oxide. The antioxidant is any one selected from the group consisting of poly(dicyclopentadiene-co-P-cresol), alkylated diphenylamines or mixtures therefrom, preferably poly(dicyclopentadiene-co-P-cresol). The pigment is preferably titanium dioxide. The titanium dioxide may be used alone or used in combination with clays and calcium carbonate, wherein the clays and the calcium carbonate serve as extenders (also known as fillers) in the titanium dioxide pigment.

The wax is any one selected from the group consisting of paraffin wax emulsion, microcrystalline wax or mixtures therefrom, preferably paraffin wax emulsion. The antifoam is any one selected from either polydimethylsiloxane or emulsion of modified silicone, preferably polydimethylsiloxane. The pH adjuster is any one selected from the group consisting of ammonia, sodium hydroxide, potassium hydroxide, ammonium chloride or mixtures therefrom, preferably ammonia.

The accelerator-free elastomeric formulation is prepared to manufacture accelerator-free hybrid elastomeric glove, wherein the method comprises the steps of:

i. mixing Base polymer A (as listed above) with Crosslinker A (as listed above) to produce mixture A and stirring the mixture A for a duration between 10 minutes to 40 minutes, preferably 15 minutes to 30 minutes, still preferably 30 minutes, wherein the Crosslinker A is used in an amount ranging between 0.40 phr to 1.00 phr based on total dry weight of the base polymers, preferably ranging between 0.50 phr to 0.70 phr based on total dry weight of the base polymers, still preferably 0.60 phr based on total dry weight of the base polymers;

ii. adding while stirring Stabilizer A (as listed above), Crosslinker B (as listed above), activator (as listed above), antioxidant (as listed above), pigment (as listed above), wax (as listed above) and antifoam (as listed above) one after another with no particular order and followed by pH adjuster (as listed above) into the mixture A to produce mixture B, wherein the mixture B comprising:

the Stabilizer A in an amount ranging between 0.15 phr to 1.00 phr based on total dry weight of the base polymers, preferably between 0.20 phr to 0.50 phr based on total dry weight of the base polymers, still preferably 0.20 phr based on total dry weight of the base polymers, the Crosslinker B in an amount ranging between 0.10 phr to 0.40 phr based on total dry weight of the base polymers, preferably between 0.15 phr to 0.20 phr based on total dry weight of the base polymers, still preferably 0.15 phr based on total dry weight of the base polymers, the activator in an amount ranging between 0.40 phr to 1.00 phr based on total dry weight of the base polymers, preferably between 0.50 phr to 0.65 phr based on total dry weight of the base polymers, still preferably 0.50 phr based on total dry weight of the base polymers, the antioxidant in an amount ranging between 0.50 phr to 2.00 phr based on total dry weight of the base polymers, preferably between 0.60 phr to 1.50 phr based on total dry weight of the base polymers, still preferably 1.00 phr based on total dry weight of the base polymers, the pigment in an amount ranging between 0.80 phr to 1.50 phr based on total dry weight of the base polymers, preferably between 0.90 phr to 1.30 phr based on total dry weight of the base polymers, still preferably 1.00 phr based on total dry weight of the base polymers, the wax in an amount ranging between 0.30 phr to 0.80 phr based on total dry weight of the base polymers, preferably between 0.40 phr to 0.50 phr based on total dry weight of the base polymers, still preferably 0.40 phr based on total dry weight of the base polymers, the antifoam in an amount ranging between 0.01 phr to 0.15 phr based on total dry weight of the base polymers, preferably between 0.03 phr to 0.08 phr based on total dry weight of the base polymers, still preferably 0.05 phr based on total dry weight of the base polymers, and the pH adjuster in an amount ranging between 0.70 phr to 2.00 phr based on total dry weight of the base polymers, preferably between 0.80 phr to 1.50 phr based on total dry weight of the base polymers, still preferably 1.00 phr based on total dry weight of the base polymers, wherein the mixture B is continuously stirred for a duration of 3 hours to 6 hours, preferably 4 hours and wherein pH range of the mixture B is adjusted to be between 10.70 to 12.00;

iii. adding Base polymer B (as listed above) and Stabilizer B (as listed above) one after another with no particular order into the mixture B to produce accelerator-free elastomeric formulation and to allow the accelerator-free elastomeric formulation to mature for a duration between 1 day to 3 days, preferably 2 days prior to be used to prepare accelerator-free hybrid elastomeric glove, wherein the Stabilizer B is used in an amount ranging between 0.50 phr to 2.50 phr based on total dry weight of the base polymers, preferably between 0.80 phr to 1.20 phr based on total dry weight of the base polymers, still preferably 1.00 phr based on total dry weight of the base polymers, wherein the Base polymer A is used in an amount ranging between 30 phr to 50 phr, preferably between 35 phr to 45 phr, still preferably 40 phr and wherein the Base polymer B is used in an amount ranging between 50 phr to 70 phr, preferably between 55 phr to 65 phr, still preferably 60 phr, respectively to make up to the total dry weight of the base polymers.

For the purpose of this invention, the phrase "one after another with no particular order" signifies that any one of the chemicals may be added first and followed by the other since order of mixing is not crucial. For the purpose of this invention, the term "hybrid" signifies presence (or mixture) of both the Base polymer A and Base polymer B in the same elastomeric formulation. For the purpose of this invention, the phrase "total dry weight of the base polymers" signifies totality calculated from sum of the dry weight of the Base polymer A and the dry weight of the Base polymer B.

The accelerator-free hybrid elastomeric glove is prepared using accelerator-free elastomeric formulation as disclosed above adopting a method commonly known in the glove manufacturing industry. The accelerator-free hybrid elastomeric glove prepared having a tensile strength ranging between 14.00 MPa to 20.70 MPa, a modulus at 500% ranging between 5.10 MPa to 7.20 MPa, an elongation at break ranging between 670% to 776%, a stress relaxation ranging between 59.10% to 62.50% and durability of more than 8 hours.

The following examples are constructed to illustrate the present invention in a non-limiting sense.

EXAMPLE 1

Accelerator-Free Elastomeric Formulation

An accelerator-free elastomeric formulation comprising:

(a) base polymers, wherein the base polymers are a mixture of Base polymer A and Base polymer B, wherein the Base polymer A is any one selected from the group consisting of NBR and PI, preferably NBR and wherein the Base polymer B is CR;

(b) crosslinkers, wherein the crosslinkers are a mixture of Crosslinker A and Crosslinker B, wherein the Crosslinker A is any one selected from the group consisting of sodium aluminate, aluminium oxide, aluminium sulphate, aluminium chloride, aluminium hydroxide, aluminium phosphate or mixtures therefrom, preferably sodium aluminate and wherein the Crosslinker B is any one selected from the group consisting of sulphur, benzothiazole sulfonamide or mixtures therefrom, preferably sulphur;

(c) stabilizers, wherein the stabilizers are base polymer specific, wherein the stabilizer used with Base polymer A is Stabilizer A and the stabilizer used with Base polymer B is Stabilizer B, wherein the Stabilizer A is any one selected from the group consisting of SDBS, alkyldiphenyloxide disulphonate, dioctyl sulphosuccinates, alkyl benzene sulphonate or mixtures therefrom, preferably SDBS and wherein the Stabilizer B is any one selected from either sulphated methyl oleate or sodium alkyl sulphates or mixtures therefrom, preferably sulphated methyl oleate;

(d) activator, wherein the activator is any one selected from the group consisting of zinc oxide, magnesium oxide, copper oxide, aluminium oxide or mixtures therefrom, preferably zinc oxide;

(e) antioxidant, wherein the antioxidant is any one selected from the group consisting of poly(dicyclopentadiene-co-P-cresol), alkylated diphenylamines or mixtures therefrom, preferably poly(dicyclopentadiene-co-P-cresol);

(f) pigment, wherein the pigment is titanium dioxide, wherein the titanium dioxide may be used alone or used in combination with clays and calcium carbonate;

(g) wax, wherein the wax is any one selected from the group consisting of paraffin wax emulsion, microcrystalline wax or mixtures therefrom, preferably paraffin wax emulsion;

(h) antifoam, wherein the antifoam is any one selected from either polydimethylsiloxane or emulsion of modified silicone, preferably polydimethylsiloxane; and (i) pH adjuster, wherein the pH adjuster is any one selected from the group consisting of ammonia, sodium hydroxide, potassium hydroxide, ammonium chloride or mixtures therefrom, preferably ammonia.

Table 1 summarizes chemical components (as listed above) used (in parts per hundred rubber, phr) in preparing the accelerator-free elastomeric formulation.

TABLE 1

Chemical components used to prepare the accelerator-free elastomeric formulation

| Chemicals | Working range (phr) | Preferred range (phr) | Dosage (phr) |
| --- | --- | --- | --- |
| Base polymer A | 30 to 50 | 35 to 45 | 40 |
| Base polymer B | 50 to 70 | 55 to 65 | 60 |
| Crosslinker A | 0.40 to 1.00 (based on total dry weight of the base polymer) | 0.50 to 0.70 (based on total dry weight of the base polymer) | 0.60 (based on total dry weight of the base polymer) |
| Crosslinker B | 0.10 to 0.40 (based on total dry weight of the base polymer) | 0.15 to 0.20 (based on total dry weight of the base polymer) | 0.15 (based on total dry weight of the base polymer) |
| Stabilizer A | 0.15 to 1.00 (based on total dry weight of the base polymer) | 0.20 to 0.50 (based on total dry weight of the base polymer) | 0.20 (based on total dry weight of the base polymer) |

TABLE 1-continued

Chemical components used to prepare the accelerator-free elastomeric formulation

| Chemicals | Working range (phr) | Preferred range (phr) | Dosage (phr) |
|---|---|---|---|
| Stabilizer B | 0.50 to 2.50 (based on total dry weight of the base polymer) | 0.80 to 1.20 (based on total dry weight of the base polymer) | 1.00 (based on total dry weight of the base polymer) |
| Activator | 0.40 to 1.00 (based on total dry weight of the base polymer) | 0.50 to 0.65 (based on total dry weight of the base polymer) | 0.50 (based on total dry weight of the base polymer) |
| Antioxidant | 0.50 to 2.00 (based on total dry weight of the base polymer) | 0.60 to 1.50 (based on total dry weight of the base polymer) | 1.00 (based on total dry weight of the base polymer) |
| Pigment | 0.80 to 1.50 (based on total dry weight of the base polymer) | 0.90 to 1.30 (based on total dry weight of the base polymer) | 1.00 (based on total dry weight of the base polymer) |
| Wax | 0.30 to 0.80 (based on total dry weight of the base polymer) | 0.40 to 0.50 (based on total dry weight of the base polymer) | 0.40 (based on total dry weight of the base polymer) |
| Antifoam | 0.01 to 0.15 (based on total dry weight of the base polymer) | 0.03 to 0.08 (based on total dry weight of the base polymer) | 0.05 (based on total dry weight of the base polymer) |
| pH adjuster | 0.70 to 2.00 (based on total dry weight of the base polymer) | 0.80 to 1.50 (based on total dry weight of the base polymer) | 1.00 (based on total dry weight of the base polymer) |

For the purpose of this invention, the phrase "total dry weight of the base polymers" signifies totality calculated from sum of the dry weight of the Base polymer A and the dry weight of the Base polymer B.

EXAMPLE 2

Preparation of the Accelerator-Free Elastomeric Formulation

A method of preparing accelerator-free elastomeric formulation, wherein the method comprising the steps of:
  i. mixing Base polymer A (as listed in example 1) with Crosslinker A (as listed in example 1) to produce mixture A and stirring the mixture A for a duration between 10 minutes to 40 minutes, preferably 15 minutes to 30 minutes, still preferably 30 minutes, wherein the Crosslinker A is used in an amount ranging between 0.40 phr to 1.00 phr based on total dry weight of the base polymers, preferably between 0.50 phr to 0.70 phr based on total dry weight of the base polymers, still preferably 0.60 phr based on total dry weight of the base polymers;
  ii. adding while stirring Stabilizer A (as listed in example 1), Crosslinker B (as listed in example 1), activator (as listed in example 1), antioxidant (as listed in example 1), pigment (as listed in example 1), wax (as listed in example 1) and antifoam (as listed in example 1) one after another with no particular order and followed by pH adjuster (as listed in example 1) into the mixture A to produce mixture B, wherein the mixture B comprising
    the Stabilizer A in an amount ranging between 0.15 phr to 1.00 phr based on total dry weight of the base polymers, preferably between 0.20 phr to 0.50 phr based on total dry weight of the base polymers, still preferably 0.20 phr based on total dry weight of the base polymers,
    the Crosslinker B in an amount ranging between 0.10 phr to 0.40 phr based on total dry weight of the base polymers, preferably between 0.15 phr to 0.20 phr based on total dry weight of the base polymers, still preferably 0.15 phr based on total dry weight of the base polymers,
    the activator in an amount ranging between 0.40 phr to 1.00 phr based on total dry weight of the base polymers, preferably between 0.50 phr to 0.65 phr based on total dry weight of the base polymers, still preferably 0.50 phr based on total dry weight of the base polymers,
    the antioxidant in an amount ranging between 0.50 phr to 2.00 phr based on total dry weight of the base polymers, preferably between 0.60 phr to 1.50 phr based on total dry weight of the base polymers, still preferably 1.00 phr based on total dry weight of the base polymers,
    the pigment in an amount ranging between 0.80 phr to 1.50 phr based on total dry weight of the base polymers, preferably between 0.90 phr to 1.30 phr based on total dry weight of the base polymers, still preferably 1.00 phr based on total dry weight of the base polymers,
    the wax in an amount ranging between 0.30 phr to 0.80 phr based on total dry weight of the base polymers, preferably between 0.40 phr to 0.50 phr based on total dry weight of the base polymers, still preferably 0.40 phr based on total dry weight of the base polymers,
    the antifoam in an amount ranging between 0.01 phr to 0.15 phr based on total dry weight of the base polymers, preferably between 0.03 phr to 0.08 phr based on total dry weight of the base polymers, still preferably 0.05 phr based on total dry weight of the base polymers and
    the pH adjuster in an amount ranging between 0.70 phr to 2.00 phr based on total dry weight of the base polymers, preferably between 0.80 phr to 1.50 phr based on total dry weight of the base polymers, still preferably 1.00 phr based on total dry weight of the base polymers, wherein the mixture B is continuously stirred for a duration of 3 hours to 6 hours, preferably 4 hours and wherein pH range of the mixture B is adjusted to be between 10.70 to 12.00;
  iii. adding Base polymer B (as listed in example 1) and Stabilizer B (as listed in example 1) one after another with no particular order into the mixture B to produce accelerator-free elastomeric formulation and allowing the accelerator-free elastomeric formulation to mature for a duration between 1 day to 3 days, preferably 2 days prior to be used to prepare accelerator-free hybrid elastomeric glove, wherein the Stabilizer B is used in an amount ranging between 0.50 phr to 2.50 phr based on total dry weight of the base polymers, preferably between 0.80 phr to 1.20 phr based on total dry weight of the base polymers, still preferably 1.00 phr based on total dry weight of the base polymers,
wherein the Base polymer A is used in an amount ranging between 30 phr to 50 phr, preferably between 35 phr to 45 phr, still preferably 40 phr and wherein the Base polymer B is used in an amount ranging between 50 phr to 70 phr, preferably between 55 phr to 65 phr, still preferably 60 phr, respectively to make up to the total dry weight of the base polymers.

For the purpose of this invention, the phrase "one after another with no particular order" signifies that any one of the chemicals may be added first and followed by the other since order of mixing is not crucial. For the purpose of this invention, the term "hybrid" signifies presence (or mixture) of both the Base polymer A and Base polymer B in the same elastomeric formulation. For the purpose of this invention, the phrase "total dry weight of the base polymers" signifies totality calculated from sum of the dry weight of the Base polymer A and the dry weight of the Base polymer B.

EXAMPLE 3

Accelerator-Free Hybrid Elastomeric Glove

Manufacturing accelerator-free hybrid elastomeric glove using accelerator-free elastomeric formulation as prepared in example 2 adopting methods commonly known in the glove manufacturing industry.

Mechanical properties (i.e. tensile strength, elongation at break and modulus at 500%) of the prepared glove are tested according to standard method ASTM D6319. Further, the prepared glove is tested for stress relaxation and durability as well. Tables 2 to 4 show comparison of the mechanical properties of the accelerator-free hybrid elastomeric glove prepared in the present invention and accelerator-free (AF) NBR glove prepared conventionally.

TABLE 2

Tensile strength (MPa) of the accelerator-free hybrid elastomeric glove of the present invention and conventional AF NBR glove

| Materials | Tensile strength (MPa) | |
| --- | --- | --- |
| | Before Aging | *After Aging |
| Conventional NBR glove | 31.10 to 43.70, averagely 36.20 | 28.30 to 42.20, averagely 35.20 |
| Accelerator-free hybrid elastomeric glove | 14.00 to 16.80, averagely 14.90 | 17.40 to 20.70, averagely 19.10 |

*Aging condition: Heating at a temperature of 100° C. for a period of 22 hours

TABLE 3

Elongation at break (%) of the accelerator-free hybrid elastomeric glove of the present invention and conventional AF NBR glove

| Materials | Elongation at break (%) | |
| --- | --- | --- |
| | Before Aging | *After Aging |
| Conventional NBR glove | 558.60 to 618.20, averagely 591.40 | 611.30 to 659.60, averagely 633.90 |
| Accelerator-free hybrid elastomeric glove | 670.10 to 723.50, averagely 688.00 | 748.30 to 776.00, averagely 757.60 |

*Aging condition: Heating at a temperature of 100° C. for a period of 22 hours

TABLE 4

Modulus at 500% (MPa) of the accelerator-free hybrid elastomeric glove of the present invention and conventional AF NBR glove

| Materials | Modulus at 500% (MPa) | |
| --- | --- | --- |
| | Before Aging | *After Aging |
| Conventional NBR glove | 14.90 to 19.30, averagely 16.90 | 11.00 to 12.60, averagely 12.00 |
| Accelerator-free hybrid elastomeric glove | 6.50 to 7.20, averagely 6.80 | 5.10 to 6.20, averagely 5.70 |

*Aging condition: Heating at a temperature of 100° C. for a period of 22 hours

Accelerator-free hybrid elastomeric glove prepared using accelerator-free elastomeric formulation of the present invention is able to achieve higher elongation at break and lower modulus at 500% of less than 6 MPa, resulting in softer glove in comparison to the conventional NBR glove.

Tables 5 and 6 show comparison of the stress relaxation and the durability properties of the accelerator-free hybrid elastomeric glove prepared in the present invention and NBR glove prepared conventionally.

TABLE 5

Stress relaxation of the accelerator-free hybrid elastomeric glove of the present invention and conventional AF NBR glove

| Materials | Stress relaxation, SR (%) | |
| --- | --- | --- |
| | Before Aging | *After Aging |
| Conventional NBR glove | 51.60 to 54.00, averagely 53.20 | 54.30 to 59.60, averagely 56.40 |
| Accelerator-free hybrid elastomeric glove | 59.50 to 61.00, averagely 60.00 | 59.10 to 62.50, averagely 61.00 |

TABLE 6

Durability (in hours) of the accelerator-free hybrid elastomeric glove of the present invention and conventional AF NBR glove

| Materials | *Durability (hours) | |
| --- | --- | --- |
| | Before Aging | After Aging |
| Conventional NBR glove | 0.70 | 1.30 |
| Accelerator-free hybrid elastomeric glove | More than 8.00 | |

*Tested with artificial sweat solution (0.5% sodium chloride, 0.1% lactic acid, 0.1% urea, 99.3% deionized water)

Accelerator-free hybrid elastomeric glove prepared using accelerator-free elastomeric formulation of the present invention is able to achieve higher SR and longer durability of more than 8 hours, for both before and after aging.

As a whole, the accelerator-free hybrid elastomeric formulation and the glove prepared therefrom (of the present invention) are able to overcome the conventional shortcomings since the accelerator-free hybrid elastomeric glove solves both the allergy as well as the durability issues and able to exhibit higher elongation, higher stress relaxation, softness and higher durability (which is proven when compared to the conventional accelerator-free glove i.e. AF NBR glove).

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups therefrom.

The method steps, processes, and operations described herein are not to be construed as necessarily requiring their performance in the particular order discussed or illustrated, unless specifically identified as an order of performance. It is also to be understood that additional or alternative steps may be employed. The use of the expression "at least" or "at least one" suggests the use of one or more elements, as the use may be in one of the embodiments to achieve one or more of the desired objects or results.

What is claimed is:

1. A formulation consisting of:
   (a) at least one base polymer,
      wherein the at least one base polymer includes a mixture of a Base polymer A and a Base polymer B,
      wherein the Base polymer A is polyisoprene rubber,
      wherein the Base polymer A is used in an amount ranging between 30 phr to 50 phr,
      wherein the Base polymer B is polychloroprene rubber, and
      wherein the Base polymer B is used in an amount ranging between 50 phr to 70 phr;
   (b) at least one crosslinker,
      wherein the at least one crosslinker includes a mixture of a Crosslinker A and a Crosslinker B,
         wherein the Crosslinker A is used in an amount ranging between 0.40 phr to 1.00 phr, based on total dry weight of the at least one base polymer, and wherein the Crosslinker B is used in an amount ranging between 0.10 phr to 0.40 phr, based on total dry weight of the at least one base polymer;
   (c) at least one stabilizer,
      wherein a Stabilizer A of the at least one stabilizer is used with the Base polymer A and a Stabilizer B of the at least one stabilizer is used with the Base polymer B, wherein the Stabilizer A is used in an amount ranging between 0.15 phr to 1.00 phr, based on total dry weight of the at least one base polymer, and
      wherein the Stabilizer B is used in an amount ranging between 0.50 phr to 2.50 phr, based on total dry weight of the at least one base polymer;
   (d) an activator,
      wherein the activator is used in an amount ranging between 0.40 phr to 1.00 phr, based on total dry weight of the at least one base polymer;
   (e) an antioxidant,
      wherein the antioxidant is used in an amount ranging between 0.50 phr to 2.00 phr, based on total dry weight of the at least one base polymer;
   (f) a pigment,
      wherein the pigment is used in an amount ranging between 0.80 phr to 1.50 phr, based on total dry weight of the at least one base polymer;
   (g) a wax,
      wherein the wax is used in an amount ranging between 0.30 phr to 0.80 phr, based on total dry weight of the at least one base polymer;
   (h) a antifoam,
      wherein the antifoam is used in an amount ranging between 0.01 phr to 0.15 phr, based on total dry weight of the at least one base polymer; and
   (i) a pH adjuster,
      wherein the pH adjuster is used in an amount ranging between 0.8 phr to 1.5 phr, based on total dry weight of the at least one base polymer,
   wherein the formulation is an accelerator-free elastomeric formulation that does not include an accelerator configured to accelerate the crosslinking process.

2. The formulation as claimed in claim 1, wherein the Crosslinker A is selected from the group consisting of sodium aluminate, aluminium oxide, aluminium sulphate, aluminium chloride, aluminium hydroxide, aluminium phosphate or mixtures therefrom and wherein the Crosslinker B is selected from the group consisting of sulphur, benzothiazole sulfonamide or mixtures therefrom.

3. The formulation as claimed in claim 1, wherein the Stabilizer A is selected from the group consisting of SDBS, alkyldiphenyloxide disulphonate, dioctyl sulphosuccinates, alkyl benzene sulphonate or mixtures therefrom and wherein the Stabilizer B is selected from either sulphated methyl oleate or sodium alkyl sulphates or mixtures therefrom.

4. The formulation as claimed in claim 1, wherein the activator is selected from the group consisting of zinc oxide, magnesium oxide, copper oxide, aluminium oxide or mixtures therefrom.

5. The formulation as claimed in claim 1, wherein the antioxidant is selected from the group consisting of poly (dicyclopentadiene-co-P-cresol), alkylated diphenylamines or mixtures therefrom.

6. The formulation as claimed in claim 1, wherein the pigment is titanium dioxide and wherein the titanium dioxide may be used alone or used in combination with clays and calcium carbonate.

7. The formulation as claimed in claim 1, wherein the wax is selected from the group consisting of paraffin wax emulsion, microcrystalline wax or mixtures therefrom.

8. The formulation as claimed in claim 1, wherein the antifoam is selected from either polydimethylsiloxane or emulsion of modified silicone.

9. The formulation as claimed in claim 1, wherein the pH adjuster is selected from the group consisting of ammonia, sodium hydroxide, potassium hydroxide, ammonium chloride or mixtures therefrom.

10. A formulation, consisting of:
   at least one base polymer,
      wherein the at least one base polymer is a mixture of a Base polymer A and a Base polymer B,
         wherein the Base polymer A is polyisoprene rubber,
            wherein the Base polymer A is used in an amount ranging between 30 phr to 50 phr,
         wherein the Base polymer B is polychloroprene rubber, and
            wherein the Base polymer B is used in an amount ranging between 50 phr to 70 phr, and
   wherein the formulation is an accelerator-free elastomeric formulation that does not include an accelerator configured to accelerate the crosslinking process.

11. A glove produced using the formulation as claimed in claim 1, wherein the glove is accelerator free and elastomeric.

\* \* \* \* \*